(12) United States Patent  (10) Patent No.: US 10,317,603 B2
Ni et al.  (45) Date of Patent: Jun. 11, 2019

(54) LIGHT GUIDE DEVICE, LIGHTING APPARATUS AND MOTOR VEHICLE

(71) Applicant: Foshan Ichikoh Valeo Auto Lighting Systems Co. Ltd, Foshan (CN)

(72) Inventors: Zebin Ni, Foshan (CN); Xianfei He, Foshan (CN)

(73) Assignee: Foshan Ichikoh Valeo Auto Lighting Systems Co. Ltd, Foshan (CN)

( * ) Notice: Subject to any disclaimer, the term of this patent is extended or adjusted under 35 U.S.C. 154(b) by 0 days.

(21) Appl. No.: 16/009,949

(22) Filed: Jun. 15, 2018

(65) Prior Publication Data

US 2018/0364406 A1    Dec. 20, 2018

(30) Foreign Application Priority Data

Jun. 15, 2017    (CN) .......................... 2017 1 0451453

(51) Int. Cl.
*F21V 8/00*    (2006.01)
*F21S 43/237*    (2018.01)

(52) U.S. Cl.
CPC .......... *G02B 6/0006* (2013.01); *G02B 6/002* (2013.01); *G02B 6/0013* (2013.01); *F21S 43/237* (2018.01); *G02B 6/0021* (2013.01)

(58) Field of Classification Search
None
See application file for complete search history.

(56) References Cited

U.S. PATENT DOCUMENTS

| | | | |
|---|---|---|---|
| 2006/0050200 A1* | 3/2006 | Nagao ................... | G02B 6/0031 349/65 |
| 2010/0259153 A1* | 10/2010 | Futami .................... | F21V 5/007 313/114 |
| 2011/0310630 A1* | 12/2011 | Nakata ................... | F21S 43/245 362/511 |
| 2015/0029741 A1* | 1/2015 | Lee ....................... | G02B 6/0096 362/551 |
| 2015/0092433 A1* | 4/2015 | Gloss ...................... | F21S 41/24 362/511 |

* cited by examiner

*Primary Examiner* — Elmito Breval
(74) *Attorney, Agent, or Firm* — Oblon, McClelland, Maier & Neustadt, L.L.P.

(57) ABSTRACT

A light guide device is for a lighting apparatus of a motor vehicle. The light guide device includes: a light incident end to receive an incident light, the light incident end having at least one light incident face and each light incident face has a first edge and a second edge that are displaced from each other in a direction along an axis of the light guide device. The light guide device can improve the uniformity and efficiency of incident light coupling of the light guide device.

20 Claims, 5 Drawing Sheets

LIGHT GUIDE DEVICE, LIGHTING APPARATUS AND MOTOR VEHICLE

BACKGROUND

Technical Field

The present invention relates to a light guide device, a lighting apparatus and a motor vehicle.

Description of the Related Art

A light guide device refers to a device for guiding light in which the light travels primarily by total reflection. The light guide device is widely used in the fields of lighting, light transmission, and the like. It may have various shapes, of such as a cylinder (referred to as a light guide rod), an elongated shape (referred to as a light guide bar, a light bar), a plate shape (referred to as a light guide plate), a ring (referred to as a light guide ring), and the like. The light guide device may generally receive an incident light at its end thereof and conduct light to another end of the light guide device or any desired exit position by the total reflection of its outer wall. Generally, the incident end face of the light guide device is a planar structure of such as a circle, or a square. The light guide device may be used, for example, in a lighting device for conducting light emitted by the light source to a desired position.

SUMMARY

It is an object of the present invention to provide a light guide device that can increase the uniformity and efficiency of incident light coupling of the light guide device. The present invention also provides an illumination apparatus including the light guide device and a motor vehicle including the lighting apparatus.

An embodiment of the present invention provides a light guide device comprising: a light incident end configured to receive an incident light, wherein the light incident end has at least one light incident face and each light incident face has a first edge and a second edge that are displaced from each other in a direction along an axis of the light guide device.

In an embodiment, the light incident end has one light incident face which is a curved face extending between the first edge and the second edge.

In an embodiment, the light incident end has a plurality of the light incident faces arranged in a direction about the axis of the light guide device.

In an embodiment, the first edge is located at upstream of the second edge in each of the light incident faces in a clockwise or anti-clockwise direction about the axis of the light guide device, and the first edge is displaced towards inside of the light guide device in the direction along the axis of the light guide device, with respect to the second edge in each of the light incident faces.

In an embodiment, the first edge is located at upstream of the second edge in each of the light incident faces in a clockwise or anti-clockwise direction about the axis of the light guide device, and the first edge is displaced towards outside of the light guide device in the direction along the axis of the light guide device, with respect to the second edge in each of the light incident faces.

In an embodiment, the first edge is located at upstream of the second edge in each of the light incident faces in a clockwise or anti-clockwise direction about the axis of the light guide device, and the light incident faces are divided into a first group of the light incident faces and a second group of the light incident faces, and
wherein the first edge is displaced towards inside of the light guide device in the direction along the axis of the light guide device, with respect to the second edge in each of the first group of the light incident faces, and
wherein the first edge is displaced towards outside of the light guide device in the direction along the axis of the light guide device, with respect to the second edge in each of the second group of the light incident faces.

In an embodiment, the first group of the light incident faces and the second group of the light incident faces are arranged alternately in the direction about the axis of the light guide device.

In an embodiment, the light incident faces are planar faces or curved faces.

In an embodiment, the first edge and the second edge extend from a periphery of the light incident end towards a center of the light incident end.

In an embodiment, the light incident end further comprises a central light transmission planar face which is located at a central position of the light incident end and is perpendicular to the axis of the light guide device, the at least one light incident face being arranged around the central light transmission planar face.

In an embodiment, the number of the light incident faces is from 8 to 16.

In an embodiment, the light incident faces have shapes of sector.

An embodiment of the present invention also provides a lighting apparatus comprising the light guide device as described above.

An embodiment of the present invention also provides a motor vehicle comprising the lighting apparatus as described above.

In the light guide device of at least one embodiment of the present invention described in the above, a plurality of light incident faces that are tilted or twisted relative to the axis of the light guide device, are provided at the light incident end, thus uniformity and optical efficiency of the brightness distribution can be improved.

DETAILED DESCRIPTION OF EMBODIMENTS

The technical solutions of the invention are further explained in detail by way of examples, with reference to the accompanying drawings. In the specification, like or similar reference numbers indicate like or similar parts. The following description of embodiments of the present invention with reference to the accompanying drawings is intended to explain the general inventive concepts of the invention and should not be construed as limiting the invention.

According to the general inventive concept of the present invention, it provides a light guide device including: a light incident end configured to receive an incident light, wherein the light incident end has at least one light incident face and each light incident face has a first edge and a second edge that are displaced from each other in a direction along an axis of the light guide device.

Further, in the following detailed description, numerous specific details are set forth in order to provide a thorough understanding of the embodiments of the present disclosure. It will be apparent, however, that one or more embodiments may also be practiced without these specific details.

Figure 1:
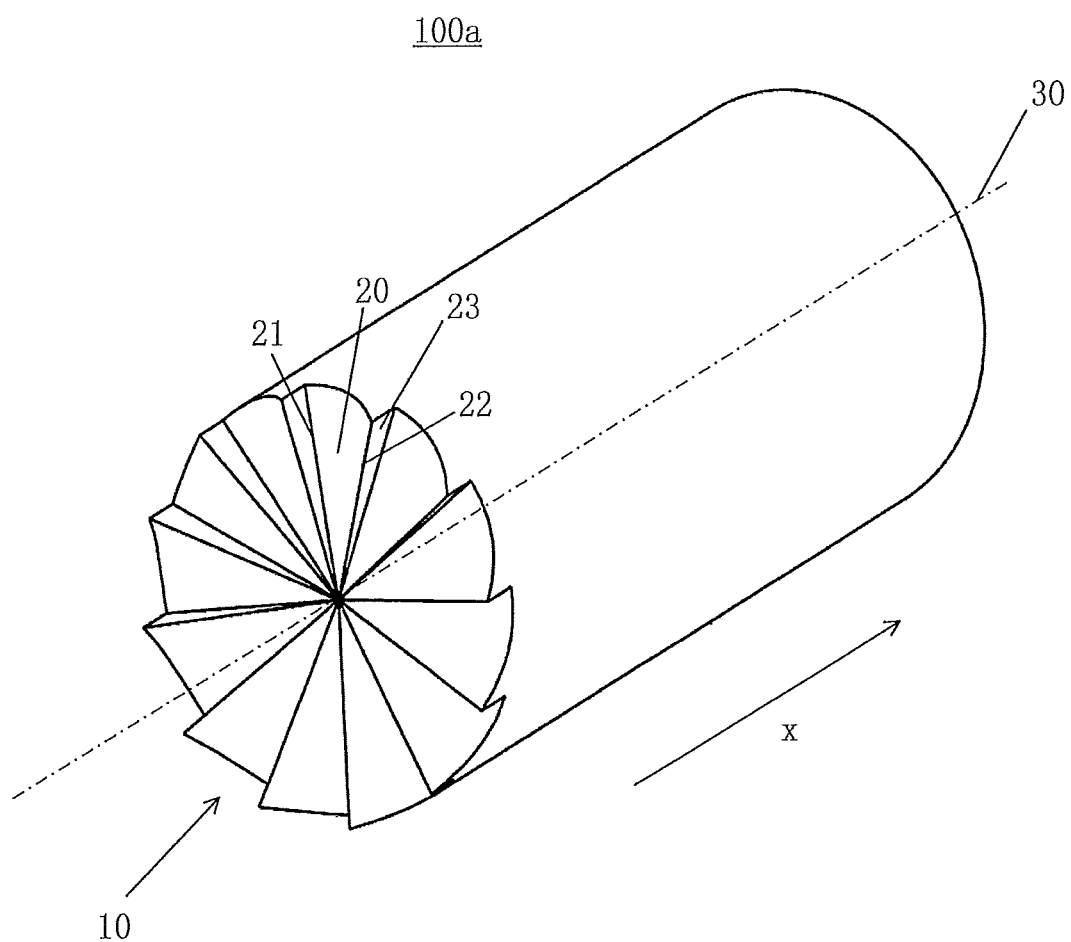
FIG. 1 schematically shows a light guide device according to an embodiment of the present invention.
Figure 2:
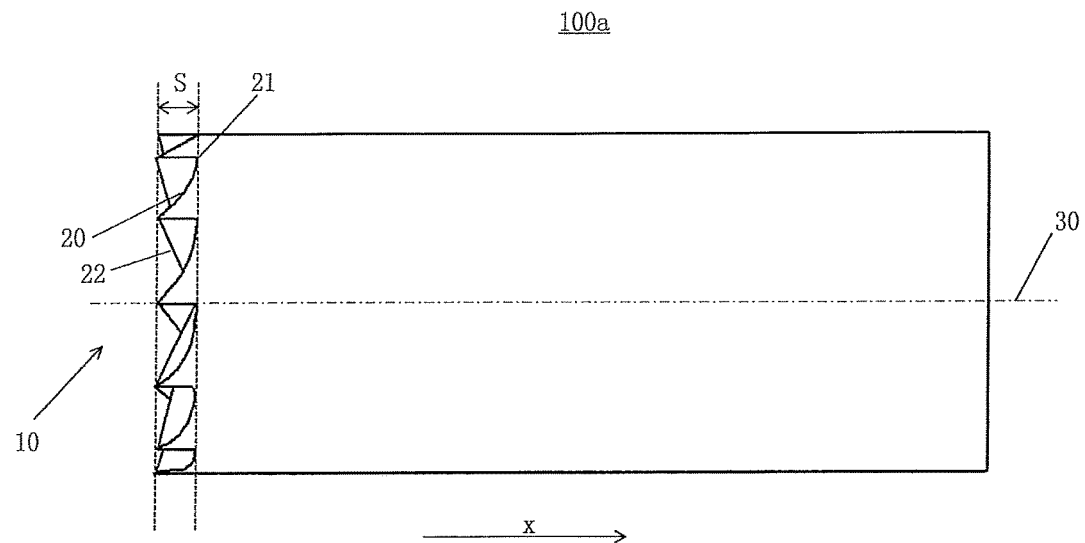
FIG. 2 schematically shows a side view of the light guide device shown in FIG. 1.

FIG. 1 and FIG. 2 schematically illustrate a light guide device 100a according to an embodiment of the present invention. The light guide device 100a includes a light incident end 10 for receiving an incident light. The light incident end 10 is provided with a plurality of light incident faces 20. Each of these light incident faces 20 has a first edge 21 and a second edge 22 displaced from one another in a direction along an axis 30 of the light guide device 100a. The light incident face 20 extends between the first edge 21 and the second edge 22. For example, the light incident face 20 may be formed by a base line sweeping from the first edge 21 to the second edge 22. The first edge 21 and second edge 22 are displaced from one another in the direction along the axis 30. It means that the incident light surface 20 is not perpendicular to the axis 30 of the light guide device 100a, but is generally tilted or twisted relative to the axis 30 of the light guide device 100a. This tilting or twisting causes the incident light to have different behavior after entering the light guide device from the light incident end 10, in comparison with the light in the conventional light guide devices.

In conventional light guide devices, the incident end surface of the light guide device is entirely in a form of a planar structure such as a circle or a square. Thus, the incident light is continuously reflected by sidewalls of the light guide device all along substantially in a plane including the axis of the light guide device, after the incident light enters the light guide device from the incident end surface. In contrast, in the light guide device 100a in accordance with the embodiment of the present invention, the plurality of light incident faces 20 are each generally angled or twisted relative to the axis 30 of the light guide device 100a, which allows the incident light to have a more uniform light intensity distribution after entering the light guide device 100a from the light incident end 10, thereby improving optical efficiency.

Figure 5:
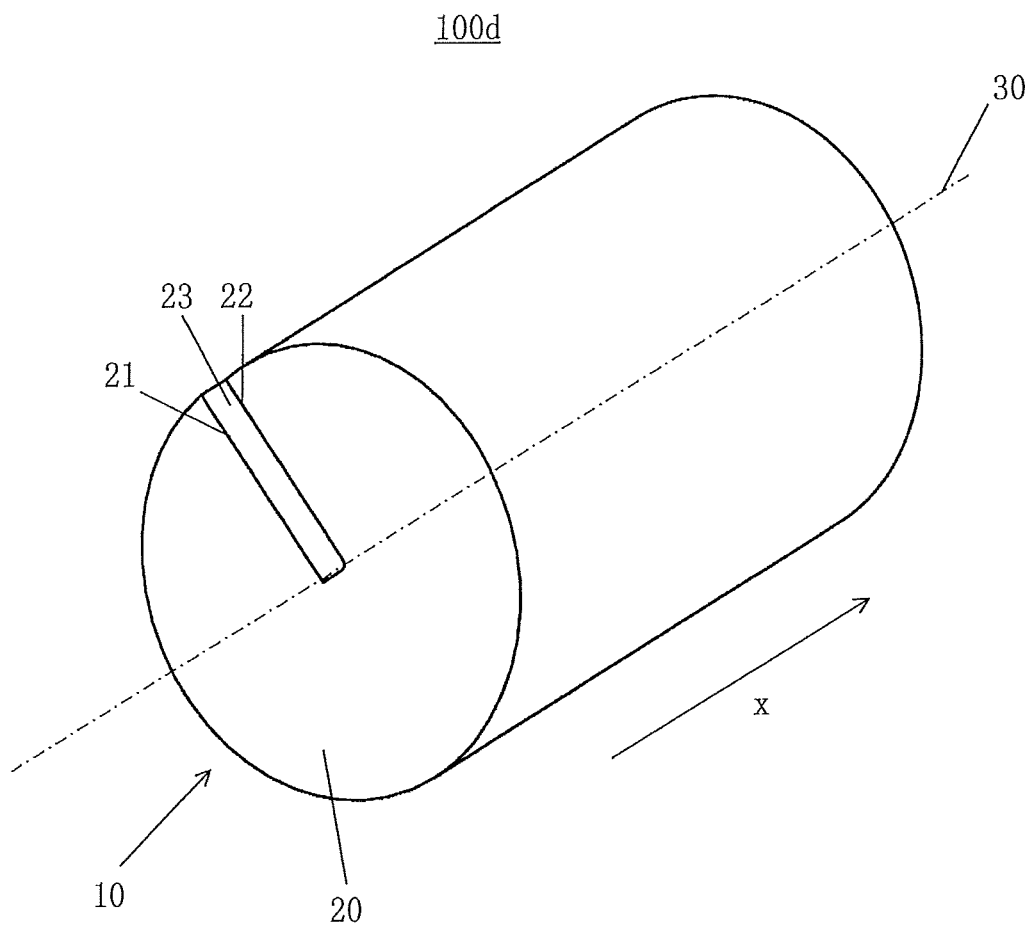
FIG. 5 schematically shows a light guide device according to a further embodiment of the present invention.
Figure 6:
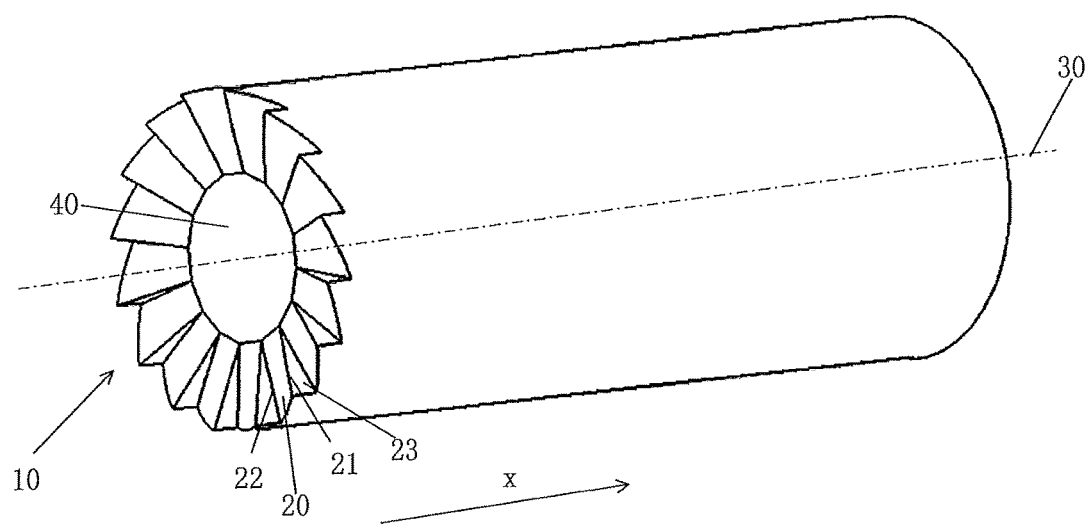
FIG. 6 schematically shows a light guide device according to another embodiment of the present invention.

It should be noted that the phrase "the first and second edges displaced from each other in the direction along the axis" does not mean that the first edge 21 and the second edge 22 must be displaced from one another in parallel, but rather, meaning that the first edge 21 and the second edge 22 do not coincide with each other in the direction along the axis such that the light incident face 20 is not perpendicular to the axis 30 of the light guide device 100a. The first edge 21 and the second edge 22 may be edges adjacent to each other (as shown in FIG. 1), or may be non-adjacent edges (as shown in FIG. 6), or may also be substantially parallel (as shown in FIG. 5). In FIG. 2, the offset S of the first edge 21 and the second edge 22 along the axis 30 at a periphery of the light incident end 10 (the first edge 21 is blocked in FIG. 2 and only one end point of the first edge 21 is shown). In the example of FIG. 2, the light incident face 20 is curved, which may allow the incident direction of the incident light at the light incident end 10 to be more diverse. It is not necessary, however, for example, the light incident face 20' may also be a plane, as in the example of the light guide device 100b shown in FIG. 3.

By way of example, a plurality of light incident faces 20, 20' may be arranged along a direction about the axis 30 of light guide device 100a, 100b. Such an arrangement may allow the direction of the incident light at various locations to be distributed more uniformly on circumference around the axis 30 of the light guide device 100a.

By way of example, in the light guide device 100a, 100b, displacements of the first edges 21 with respect to the corresponding second edges 22 in all the light incident faces 20, 20' may be in the same direction.

Figure 3:
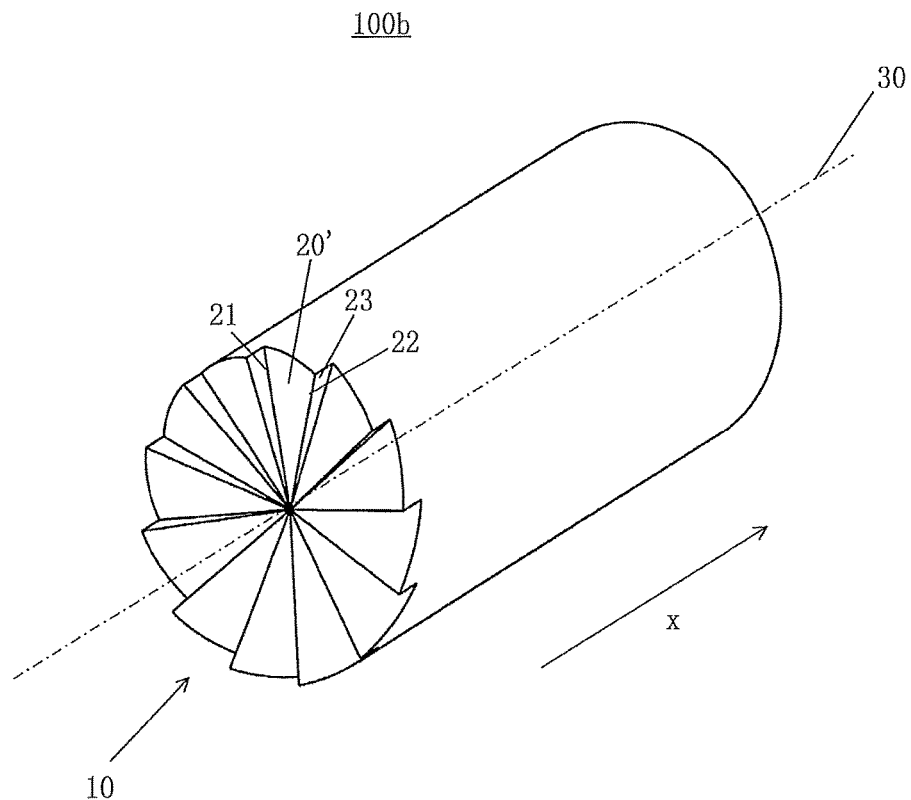
FIG. 3 schematically shows a light guide device according to another embodiment of the present invention.

In the example of FIGS. 1-3, in each of the light incident faces 20, 20', the first edge 21 is positioned upstream of the second edge 22 along the clockwise direction about the axis of the light guide device 100a, 100b, and the first edge 21 of each of the light incident faces 20, 20' is displaced with respect to the second edge 22 towards an interior of the light guide device 100a, 100b (e.g., along the direction x in FIG. 1 to FIG. 3), along the axis 30 of the light guide device 100a, 100b. In another example, the first and second edges may also be defined in an opposite direction (anti-clockwise direction), i.e., in an anti-clockwise direction along the axis of the light guide device, in each of the light incident faces, the first edge is located upstream of the second edge, and the first edge of each of the incident light faces is displaced with respect to the corresponding second edge towards the interior of the light guide device along the axis of the light guide device.

In another example, the first edge may also be displaced towards outside of the light guide device (e.g., in the opposite direction to the direction x) with respect to the second edge. And specifically, in each of the light incident faces, the first edge is located upstream of the second edge along the clockwise or anti-clockwise direction about the axis of the light guide device, and the first edge of each of the incident light faces is displaced with respect to the second edge towards outside of the light guide device along the axis of the light guide device.

By way of example, since there may be a position difference between adjacent light incident faces 20, 20', the adjacent light incident faces 20, 20' may be connected by a step surface 23. The step surface 23 may not be used to receive the incident light.

By way of example, in light guide device, the displacements of the first edges 21 with respect to the second edges 22 in all the light incident faces may not be in the same direction. In particular, in each of the light incident faces, the first edge is located upstream of the second edge along the clockwise or anti-clockwise direction about the axis of the light guide device. In some of the light incident faces (a first set of light incident faces), the first edges are displaced with respect to the second edges toward the interior of the light guide device along the axis of the light guide device, and in others of the light incident faces (a second set of light incident faces), the first edges are displaced with respect to the second edges towards outside of the light guide device along the axis of the light guide device.

Figure 4:
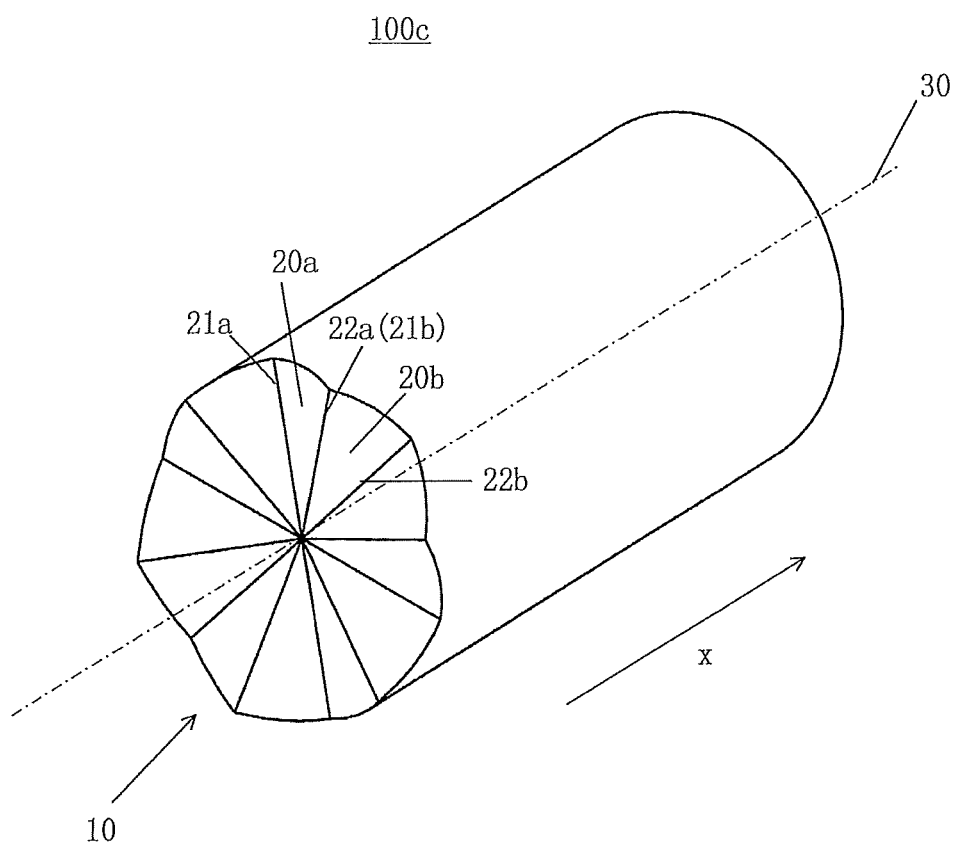
FIG. 4 schematically shows a light guide device according to yet another embodiment of the present invention.

FIG. 4 illustrates a light guide device 100c according to another embodiment of the present invention. In the light guide device 100c, two adjacent light incident faces 20a and 20b are shown. The light incident face 20a has a first edge 21a and a second edge 22a. The light incident face 20b has a first edge 21b and a second edge 22b. For ease of description, the first edges 21a, 21b and the second edges 22a, 22b are defined in the clockwise direction, i.e., in each of the light incident faces, the first edges 21a, 21b are located upstream of the second edges 22a, 22b (alternatively, the first edges 21a, 21b and the second edges 22a, 22b may also be defined in the anti-clockwise direction, and the details will be omitted here). In the example of FIG. 4, the first edge 21a of the light incident face 20a is displaced with respect to the second edge 22a towards outside of the light guide device 100c in the direction along the axis 30 of the light guide device 100c, and the first edge 21b of the light incident face 20b is displaced with respect to the second edge 22b towards inside of the light guide device 100c in the direction along the axis 30 of the light guide device 100c. That is, the displacement of the light incident face 20a with respect to the axis 30 of the light guide device 100c is in a direction opposite to the direction in which the light incident face 20b is displaced with respect to the axis 30 of the light guide device 100c. To this end, the light incident faces 20a and 20b in light guide device 100c may be divided into two groups. The first edges 21a of the first group of light incident faces 20a are displaced with respect to the second edges 22a towards the inside of the light guide device 100c along an axis of light guide device 100c, while the first edges 21b of the second group of light incident faces 20b are displaced with respect to the second edges 22b towards outside of the light guide device 100c along the axis of the light guide device 100c. In this example, the first group of light incident faces 20a and the second group of light incident faces 20b are alternately distributed in a direction about the axis of the light guide device 100c.

In the above arrangement, as an example, the first edge 22a of the light incident face 20a and the first edge 21b of light incident face 20b that are adjacent to each other may be coincident with each other, thereby avoiding the presence of any steps between adjacent light incident faces.

FIG. 5 illustrates a light guide device 100d according to yet another embodiment of the present invention. In the light guide device 100d, the light incident end 10 is provided with only one light incident face 20 which is a curved surface extending between the first edge 21 and the second edge 22, for example, a smooth curved surface. This approach may be helpful to molding process of the light guide device.

FIG. 6 illustrates a light guide device 100e according to a further embodiment of the present invention. In the light guide device 100e, the light incident end 10 further includes a central light transmission planar face 40 positioned at a central position of the light incident end 10 and perpendicular to the axis 30 of the light guide device 100e. At least one light incident face 20 is disposed at the periphery of the central light transmission planar face 40. The central light transmission planar face 40 may be used to control the energy distribution of the incident light in various directions after the incident light enters the light guide device 100e. The energy distribution may be achieved by adjusting size of the area of the central light transmission planar face 40.

In embodiments of the present invention, the incident light faces 20, 20', 20a, and 20b may be planar or curved. The light incident faces 20, 20', 20a and 20b may extend smoothly between the first edges 21, 21a, 21b and the second edges 22, 22a, 22b.

In an embodiment of the present invention, the first edges 21, 21a, 21b and the second edges 22, 22a, 22b may extend from the periphery of the light incident end 10 towards the center of the light incident end 10. By way of example, the first edges 21, 21a, 21b and the second edges 22, 22a, 22b may converge into one point at the center of the light incident end 10, as shown in FIG. 1, FIG. 3 and FIG. 4, or may extend to the central light transmission planar face 40, as shown in FIG. 6.

In embodiments of the present invention, the number of the light incident faces 20, 20', 20a and 20b may be any number greater than or equal to one. In general, increasing the number of the light incident faces 20, 20', 20a and 20b may advantageously improve coupling effect (increased brightness uniformity) of the incident light, while the reduction in the number of the incident light faces 20, 20', 20a and 20b is beneficial to reduce the processing difficulty. Considering the balance between them, such as the number of the incident light faces 20, 20', 20a and 20b may be 8 to 16, such as 10 to 12.

In one embodiment, the light incident faces 20, 20', 20a, and 20b may have a sector shape. This may facilitate fully utilizing the area of the light incident end 10.

Although the main body of each of the light guide devices 100a, 100b, 100c, 100d and 100e described above in the examples shown in FIGS. 1-6 has circular cross section, however, the embodiments of the present invention are not limited to this, and the light guide device may have any cross-sectional shape known in the art. For example, it may also have a cross-sectional shape of square, polygon, etc., as long as the light coupled into the light guide device from the light incident end 10 still satisfies the requirements for light transmission by light guide device such as total reflection conditions to achieve the desired function.

Since the light guide device needs to conduct the light incident from the light incident end by the total reflection, it will be appreciated by those skilled in the art that the light incident faces 20, 20', 20a and 20b in the light guide device in the embodiment of the present invention still require the light entering the light guide device through these light incident faces to meet the total reflection condition of the light guide device, and the specific directions of the light incident faces 20, 20', 20a and 20b may be determined according to parameters such as material refractive index of the light guide device. For example, light incident faces 20, 20', 20a, and 20b may generally be inclined at an angle greater than 0 degrees and less than 25 degrees with respect to the cross-section of the light guide device perpendicular to the axis 30. However, embodiments of the present invention are not limited to this.

By way of example, the offset S between the first edge 21, 21a and 21b and the second edge 22, 22a and 22b of the light incident face 20, 20', 20a and 20b along the axis 30 is 1 mm to 3 mm, e.g., 1.5 mm at the periphery of the light incident end 10.

By way of example, the light incident faces 20, 20', 20a and 20b may be fabricated by performing a variety of molding processes known in the art on the light incident end 10 of each of the light guide devices 100a, 100b, 100c, 100d and 100e.

By way of example, the light guide devices 100a, 100b, 100c, 100d, and 100e may be made from a transparent glass, resin or plastic material, such as PMMA (polymethyl methacrylate) or polycarbonate.

The light guide devices 100a, 100b, 100c, 100d, and 100e, according to embodiments of the present invention, may be supported or suspended by any known suitable means for holding optical elements, such as a support, a boom, etc.

The invention also provides a lighting apparatus including the light guide device 100a, 100b, 100c, 100d, and 100e as described in any of the preceding embodiments. The lighting apparatus may include, for example, a vehicle light of any motor vehicle.

The invention also provides a motor vehicle including the lighting apparatus including the light guide device 100a, 100b, 100c, 100d, and 100e as previously described.

While the invention has been described in connection with the accompanying drawings, embodiments disclosed in the drawings are intended to illustrate the preferred embodiments of the invention and are not to be construed as limiting the invention. The scales in the drawings are merely illustrative and are not to be construed as limiting the invention.

While some embodiments of the general inventive concept have been shown and described, those skilled in the art will appreciate that changes may be made to these embodiments without departing from the principles and spirit of the general inventive concept. The scope of the present invention is defined in the appended claims and their equivalents.

What is claimed is:

1. A light guide device comprising:
a light incident end configured to receive an incident light, wherein the light incident end has at least one light incident face and each light incident face has a first edge and a second edge that are displaced from each other in a direction along an axis of the light guide device.

2. The light guide device according to claim 1, wherein the light incident end has one light incident face which is a curved face extending between the first edge and the second edge.

3. The light guide device according to claim 2, wherein the first edge and the second edge extend from a periphery of the light incident end towards a center of the light incident end.

4. The light guide device according to claim 2, wherein the light incident end further comprises a central light transmission planar face which is located at a central position of the light incident end and is perpendicular to the axis of the light guide device, the at least one light incident face being arranged around the central light transmission planar face.

5. A lighting apparatus comprising the light guide device according to claim 2.

6. The light guide device according to claim 1, wherein the light incident end has a plurality of the light incident faces arranged in a direction about the axis of the light guide device.

7. The light guide device according to claim 6, wherein the first edge is located at upstream of the second edge in each of the light incident faces in a clockwise or anti-clockwise direction about the axis of the light guide device, and the first edge is displaced towards inside of the light guide device in the direction along the axis of the light guide device, with respect to the second edge in each of the light incident faces.

8. The light guide device according to claim 7, wherein the number of the light incident faces is from 8 to 16.

9. The light guide device according to claim 7, wherein the light incident faces have shapes of sector.

10. The light guide device according to claim 6, wherein the first edge is located at upstream of the second edge in each of the light incident faces in a clockwise or anti-clockwise direction about the axis of the light guide device, and the first edge is displaced towards outside of the light guide device in the direction along the axis of the light guide device, with respect to the second edge in each of the light incident faces.

11. The light guide device according to claim 6, wherein the first edge is located at upstream of the second edge in each of the light incident faces in a clockwise or anti-clockwise direction about the axis of the light guide device, and the light incident faces are divided into a first group of the light incident faces and a second group of the light incident faces, and
wherein the first edge is displaced towards inside of the light guide device in the direction along the axis of the light guide device, with respect to the second edge in each of the first group of the light incident faces, and
wherein the first edge is displaced towards outside of the light guide device in the direction along the axis of the light guide device, with respect to the second edge in each of the second group of the light incident faces.

12. The light guide device according to claim 11, wherein the first group of the light incident faces and the second group of the light incident faces are arranged alternately in the direction about the axis of the light guide device.

13. The light guide device according to claim 6, wherein the number of the light incident faces is from 8 to 16.

14. The light guide device according to claim 6, wherein the light incident faces have shapes of sector.

15. The light guide device according to claim 6, wherein the light incident faces are planar faces or curved faces.

16. The light guide device according to claim 1, wherein the light incident faces are planar faces or curved faces.

17. The light guide device according to claim 1, wherein the first edge and the second edge extend from a periphery of the light incident end towards a center of the light incident end.

18. The light guide device according to claim 1, wherein the light incident end further comprises a central light transmission planar face which is located at a central position of the light incident end and is perpendicular to the axis of the light guide device, the at least one light incident face being arranged around the central light transmission planar face.

19. A lighting apparatus comprising the light guide device according to claim 1.

20. A motor vehicle comprising the lighting apparatus according to claim 19.

* * * * *